United States Patent [19]

Cody

[11] Patent Number: 4,540,209
[45] Date of Patent: Sep. 10, 1985

[54] RIGGING METHOD AND HOOK THEREFOR

[75] Inventor: Stuart E. Cody, Sandy, Oreg.

[73] Assignee: Esco Corporation, Portland, Oreg.

[21] Appl. No.: 523,112

[22] Filed: Aug. 15, 1983

[51] Int. Cl.³ ............................................. B66C 21/00
[52] U.S. Cl. ............................... 294/74; 24/230.5 TP
[58] Field of Search ...................... 212/97; 294/74, 78; 24/115 R, 230.5

[56] References Cited

U.S. PATENT DOCUMENTS

| | | | |
|---|---|---|---|
| 3,175,264 | 3/1965 | Maras | 294/74 |
| 3,239,900 | 3/1966 | Bottoms | 294/74 |
| 3,323,185 | 6/1967 | Maras | 294/74 |
| 3,335,468 | 8/1967 | Harley | 24/115 R |

Primary Examiner—Trygve M. Blix
Assistant Examiner—Thomas J. Brahan

[57] ABSTRACT

A generally arcuate logging hook including three integral portions, a top eye portion incorporating a sliding way or ring-like opening, an intermediate threading portion having a general S-shaped opening providing a path for threading a ferrule-equipped choker line, and a bottom socket portion to seat the choker line ferrule.

4 Claims, 11 Drawing Figures

U.S. Patent   Sep. 10, 1985   Sheet 1 of 2   4,540,209
FIG. 1
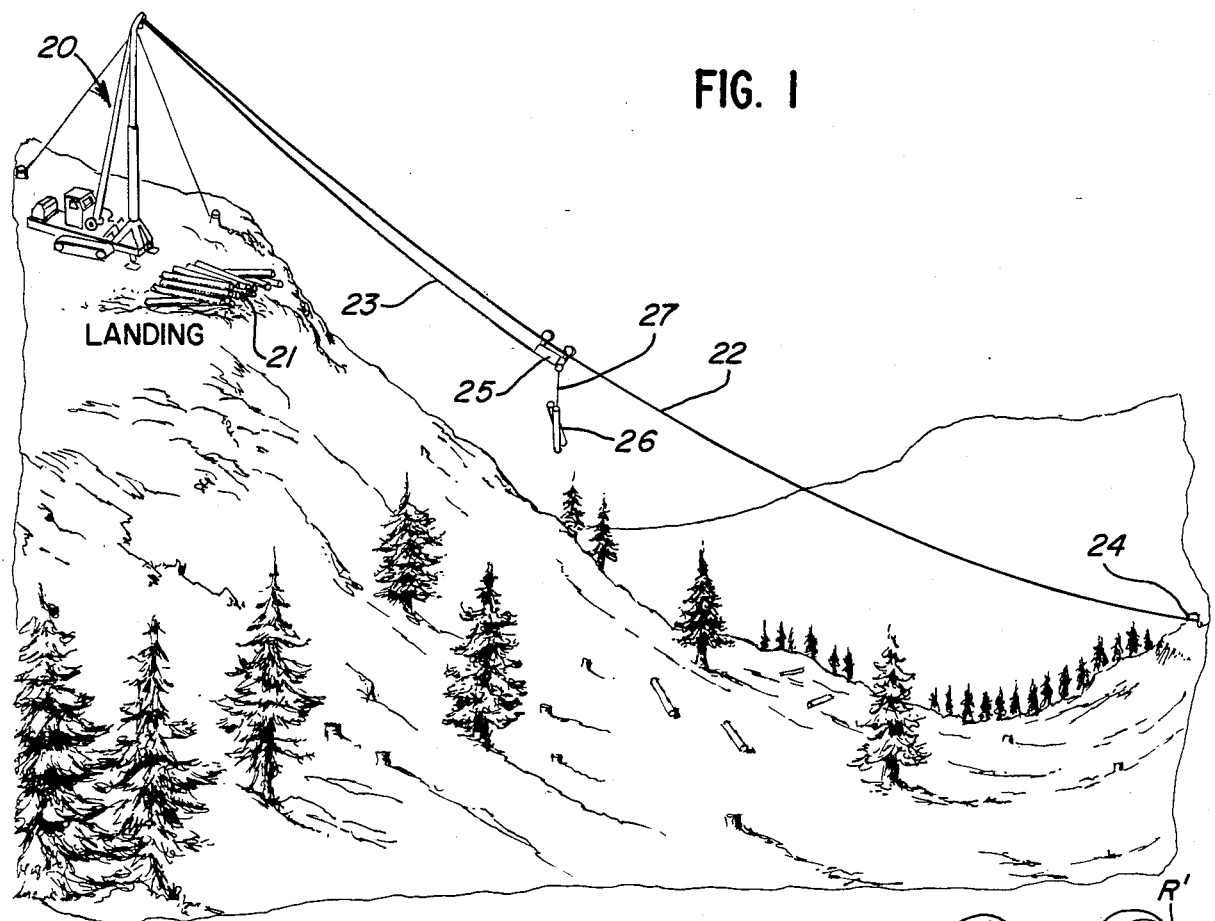
FIG. 2 PRIOR ART
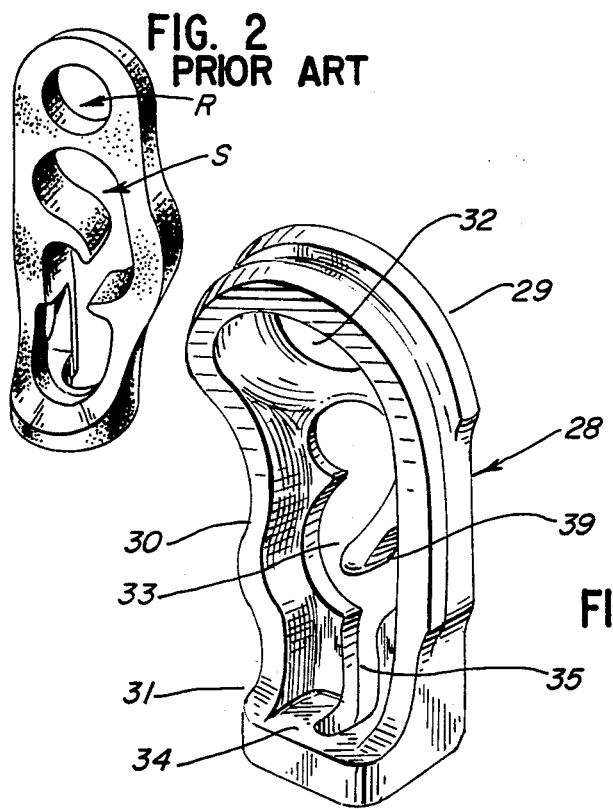
FIG. 3 PRIOR ART
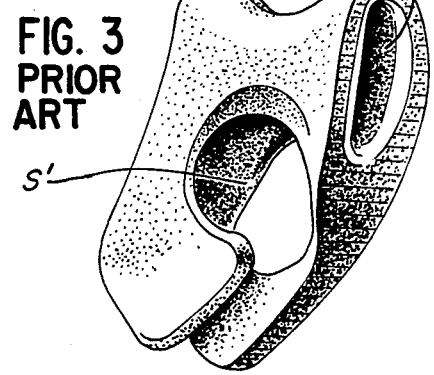
FIG. 4

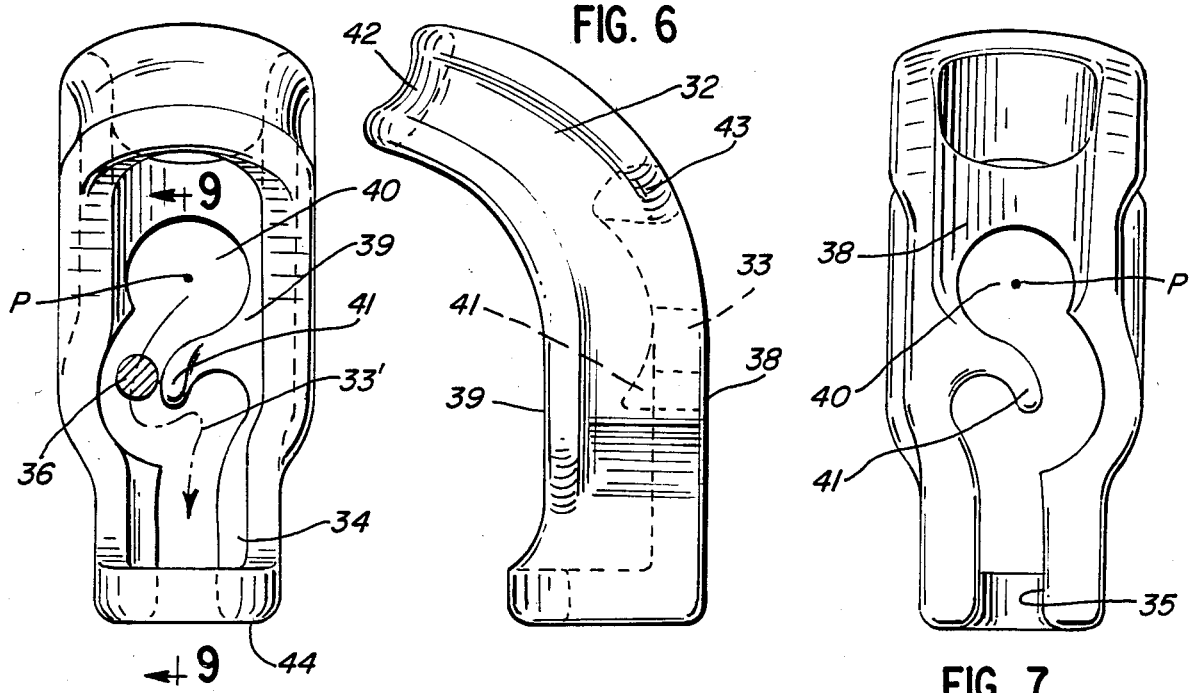
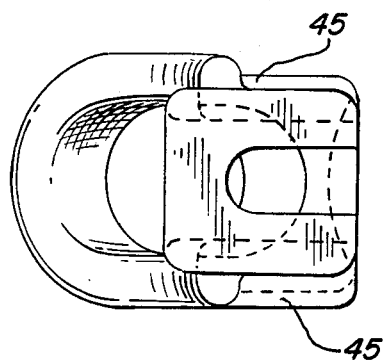
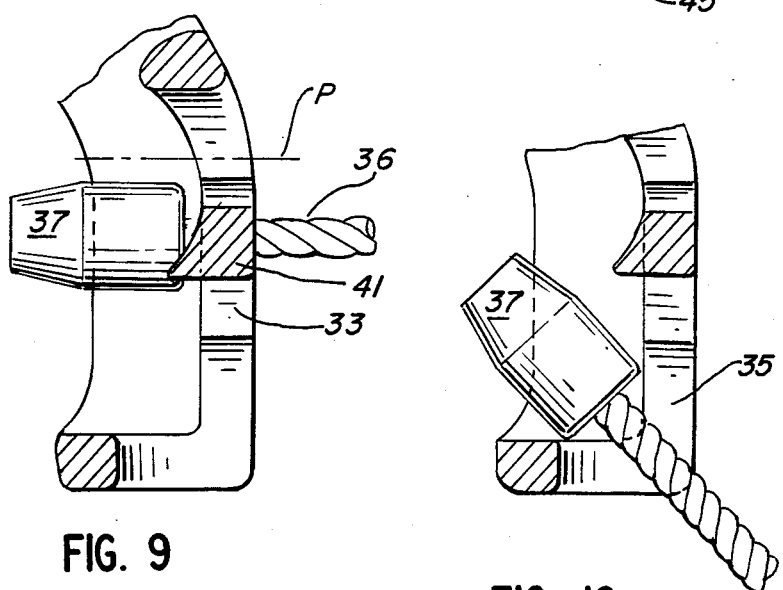
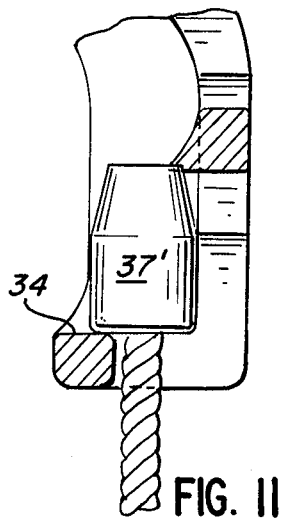

RIGGING METHOD AND HOOK THEREFOR

BACKGROUND AND SUMMARY OF INVENTION

This invention relates to a rigging method and hook therefor, particularly for the logging industry.

The invention can be best illustrated by its application to high lead rigging. This embodies a skyline equipped with a traveling carriage. The general environment can be seen in U.S. Pat. No. 4,347,938.

There have been two basic ways of securing logs to the carriage for movement up an incline. One embodies a plurality of chains which depend from the carriage with the lower end of each chain being equipped with a butt hook such as a McGovern butt hook which has been used for upwards of 40 years. Each McGovern hook receives one ferrule-equipped end of a choker line with the other end of the choker line being wrapped around the log and secured to the line by a choker hook. This latter arrangement can be seen in co-owned U.S. Pat. No. 2,872,716.

The other method of securing logs to the carriage involves a single wire rope line which depends from the carriage (called a "drop line") on which are slidably mounted a plurality of bunching hooks such as those seen in co-owned U.S. Pat. No. 3,276,809. Each bunching hook, in turn, receives one ferrule-equipped end of a choker line with the other end of the choker line being wrapped around the log—again as just described above. This second arrangement has become much more prevalent than the first primarily because it permits the accumulating or bunching of the drop line hooks on a single line which makes for economies in cost and operation. However, both of these costs are proving excessive and the operation itself has been characterized by a number of disadvantages.

Two significant disadvantages reside in the difficulty of attaching the choker line to the bunching hook when the upward movement phase of the operation is to be commenced, and later the pendency of the choker lines to become detached from the bunching hooks when they are being returned downhill for another cycle.

Complicating the operation and contributing to the slowness and therefore inefficiency of the cycling was the fact that the loggers were fighting brushy hillsides, deep snow, buried logs and tangled chokers.

SUMMARY OF INVENTION

The invention stemmed from the desire to improve the cycle time of the carriage to the logs and back to the landing. More specifically, it addressed the problem of providing some type of hooking system that would allow the loggers to unhook chokers (under the adverse conditions mentioned above) and hook chokers that were set already. If this could be achieved, the loggers would have the time to untangle chokers and set them while the carriage was on the way to the landing. The cycling time has been improved and the operation of hooking and unhooking simultaneously improved through the use of a novel hook which constitutes an important part of the invention. The inventive hook includes three integral portions, a top eye portion incorporating a sliding way or ring-like opening generally of the type seen in U.S. Pat. No. 3,276,809; an intermediate threading portion having a generally S-shaped opening of the type provided for many years in the McGovern butt hook; and a bottom socket portion such as that used for many years and which is also illustrated in the above mentioned U.S. Pat. No. 2,872,716. Through this novel combination of known elements a number of operational advantages flow. Important is the ability with the inventive hook for a logger to thread the choker line into the inventive hook without the need for "muscling" or flexing the choker line. This means that the logger can perform the threading using only one hand while the other hand is used to hold the logger in a position of safety, i.e., hanging onto a shrub, tree, etc. It will be appreciated that when logging is performed on an incline it is very difficult to stand erect and utilize both hands for the choker line threading operation. Another advantage stems from the fact that the choker line ferrule is firmly seated within the socket of the inventive hook and resists inadvertent dislodgment which could occur when the empty choker lines are on the return trip.

Other objects and advantages of the invention may be seen as this specification proceeds.

DESCRIPTION OF THE DRAWINGS

The invention is described in conjunction with an illustrative embodiment in the accompanying drawing, in which—

FIG. 1 is a fragmentary perspective view of a high lead rigging installation—an environment in which the invention can be used to great advantage;

FIG. 2 is a perspective view of the McGovern butt hook of the prior art;

FIG. 3 is a perspective view of a bunching hook of the prior art;

FIG. 4 is a perspective view of the inventive hook as seen from the rear or underside when the hook is accumulated with others incident to the upward travel of the carriage;

FIG. 5 is a rear elevational view of the inventive hook;

FIG. 6 is a side elevational view of the inventive hook;

FIG. 7 is a front elevational view of the inventive hook;

FIG. 8 is a bottom elevational view of the inventive hook; and

FIGS. 9–11 are fragmentary sectional views of the inventive hook as seen along the line 9—9 of FIG. 5 showing the ferrule-equipped choker line in the process of being installed in the inventive hook.

DETAILED DESCRIPTION

In the illustration given, FIG. 1 illustrates somewhat schematically the arrangement of a high lead rigging, i.e., a running skyline logging system. At the upper end the system involves selecting a relatively flat piece of land designated a "landing". Positioned on the landing is a yarder generally designated 20 and the landing is seen to hold previously accumulated logs as at 21. The logging system itself employs a skyline 22 a main line 23 and a lower anchor 24. The skyline 22 is continued beyond the carriage 25 to the anchor 24. Intermediate supports maybe provided depending upon the particular installation. In any event, the carriage 25 supports a plurality of logs 26 from a depending drop line 27 or may carry a plurality of chains as described previously utilizing butt hooks.

The prior art McGovern butt hook is illustrated in FIG. 2 and is seen to have an intermediate portion with a generally S-shaped slot designated S. The upper portion is equipped with a ring-like opening designated R which has an axis parallel to the path of movement of a choker line when the same is being threaded into the S-shaped slot S. Characteristically, the McGovern hook has flat sides with the openings extending perpendicular to these flat sides. Historically, the McGovern butt hook has been utilized only with chains depending from the carriage 25, the connection with the ring-like opening R being made by a connecting link or shackle.

Another hook used by the prior art in conjunction with the carriage 25 is seen in FIG. 3 where both the upper opening R' and the choker line receiving slot S' are considerably different from that of the McGovern butt hook of FIG. 2. As indicated previously, the construction of the FIG. 3 prior art hook is like that disclosed in U.S. Pat. No. 3,276,809. In both cases, however, the bottom-most part or socket is analogous to that seen in U.S. Pat. No. 2,872,716.

The inventive hook is seen in perspective view in FIG. 4. In a general sense, the inventive hook can be considered a combination of the prior art hooks of FIGS. 2 and 3. Even though the various elements could be considered old, it was surprising to achieve the significant advantages of the invention by combining, for example, the S-shaped threading opening S of the McGovern butt hook with the sliding way or ring-shaped opening R' of the FIG. 3 prior art hook.

The inventive hook as seen in FIG. 4 is generally designated 28 and is seen to include an upper or top eye portion 29, an intermediate threading portion 30 and a bottom socket portion 31.

The upper or top eye portion 29 is equipped with an opening 32 adapted to receive the drop line 27 with a plurality of the hooks 28 being accumulated or bunched in the fashion previously referred to as being illustrated in U.S. Pat. No. 3,276,809. The intermediate threading portion 30 has a generally S-shaped opening 33 provided therein. The S-shape can be appreciated from the construction line 33' applied to FIG. 5 and indicating a portion of the threading path. The bottom socket portion 31 has a conventional seat or base 34 for the support of one ferrule-equipped end of the choker line—see also FIG. 11. Provided in conventional fashion in the bottom socket portion 31 is a slot 35.

OPERATION

The operation of the inventive hook 28 can be best appreciated from a consideration of FIGS. 9–11 insofar as the installation of the choker line is concerned. The choker line is designated 36 while the ferrule connected to the upper end thereof is designated 37. It will be appreciated that a second ferrule (not shown) is secured to the lower end of the choker line 36 and that choker hook (also not shown) is slidably mounted on the choker line 36 so as to provide the necessary loop for encircling the log.

In FIG. 9, the ferrule 37 is initially introduced, i.e., threaded into the hook 28 by movement along a path P (see also FIG. 5). The ferrule 37 is moved sufficiently to the left in FIG. 10 so as to pass completely through the opening 33 and thereby have the wire rope 36 positioned within the opening 33. Thereafter, the wire rope 36 is moved downwardly along the S-shaped path 33' as illustrated in FIG. 5. Ultimately the wire rope 36 enters the slot 35 and the wire rope thereafter is turned to bring the ferrule into vertical seated position as at 37' in FIG. 11—FIG. 10 showing an intermediate position of the ferrule 37.

Referring now to FIGS. 5–8, the numeral 38 designates the front wall of the hook 28. This is the wall positioned uppermost when the hooks are accumulated incident to being mounted on the drop line 27. The numeral 39 designates the rear wall and it is seen that the opening 33 extends through the hook 28 from the front wall to the rear wall. The opening 33 is characterized by an enlargement 40 (see FIGS. 5 and 7) which is sized to pass the ferrule 37. The remainder of the opening 33 and proceeding downwardly is constricted relative to the enlargement 40 so as not to permit the ferrule to pass therethrough but only accommodate the passage of the wire rope 36. An integral curved tang 41 is provided to develop a portion of the S-shaped opening 33.

A top wall 42 (see FIG. 6) is provided to define the upper boundary of the ring-shaped opening 32 and an intermediate wall 43 of lesser extent provides the bottom boundary of the opening 32. The socket 34 (see particularly FIG. 5) is defined in part by the bottom wall 44 and which is interrupted as seen in FIG. 7 to provide the slot 35. Sidewalls 45 can be seen in FIG. 8.

As can be best appreciated from FIG. 6, the axis of the opening 32 is inclined at an acute angle to the threading path P, the angle being of the order of about 60°. This is significantly different from the parallelism of the rope axis relative to the threading axis in the prior art of FIG. 2.

The provision of the sidewalls 45 generally of a width equal to that of the topwall 42 makes for a sturdy, yet economical construction to develop the necessary socket 34 yet economize on metal. In contrast, the intermediate wall 43 defining the lower boundary of the opening 32 is less than about one-half the width of the sidewalls 45, i.e., approximating the distance between the front and rear walls 38 and 39.

Excellent results are obtained when the tang 41 (see particularly FIG. 6) is curved rearwardly, in effect having an extension from the back wall 39, which serves to close off the top portion of the socket 34. This keeps the ferrule 37 from moving very far in the vertical direction when the ferrule is properly seated in the socket 34. Also, the rearward extension portion of the tang 41 acts as a partial stop to keep the ferrule locked in the hook if it inadvertently jumps. However, this does not interfer with the normal intentional removal of the ferrule 37 from the socket 34 inasmuch as the ferrule and line have to be cocked to the position seen in FIG. 10 to bring about intentional removal.

In operation, it has been found that the use of the inventive hook accomplished every aspect desired to increase production, maintain safety, untangle chokers and reduce cycle time. At a bare minimum, these hooks increased production between 30 and 40%. Not only did the inventive hook increase production by this large factor, but it made the logging job much easier. Choker setters are no longer fighting tangled chokers and drop lines. When chokers arrive in the brush from the landing, they must be untangled to be set. This is time-consuming. Now they are unhooked and out of the way in a matter of seconds. Setters now can move to preset logs and hookup with much more ease. This is due to the fact that, instead of pulling chokers and drop line to the logs, all they have to do is pull the drop line and the inventive hooks. In actual field trials made comparing the old style versus the new style of presetting, production went from 200-240 pieces per 8 hour shift, to 350-450 pieces.

The reason the inventive hook is more efficient than other preset systems is because it is less cumbersome and lighter in weight as well as easier to execute. Additionally, it is less costly. For example, the well known bullet system is too heavy and costly plus it lacks the advantage of always staying hooked.

It should be appreciated that the inventive hook because of its versatility and inexpensiveness can be used for other riggings than just the high lead or skyline logging described hereinbefore. It can be used for shotgun, slack line, carriage and butt rigging systems for cable yarders, along with various skidder and prime mover logging systems.

While in the foreoing specification a detailed description of an embodiment of the invention has been set down for the purpose of illustration, many variations in the details hereingiven may be made by those skilled in the art without departing from the spirit and scope of the invention.

I claim:

1. A logging hook comprising a unitary metal member being defined by front, rear, side, top and bottom walls and having a top eye portion, an intermediate threading portion and a bottom socket portion, a generally S-shaped opening in said intermediate threading portion extending therethrough from said front to said rear walls, an enlargement at the upper end of said opening providing a path for threading a ferrule-equipped choker line through said opening, a slot in said bottom socket portion extending from said front wall and partway across said bottom wall, said slot communicating with said S-shaped opening and providing a further path for said choker line to pass from being threaded through said S-shaped opening into said bottom socket portion to seat said choker line ferrule in said socket, said top eye portion having a sliding way for a logging line with said sliding way having a threading axis extending at an acute angle to said threading path, said front and rear walls of said top eye portion being generally arcuate to define a generally convex front wall to facilitate bunching of said hooks on said drop line.

2. The structure of claim 1 in which said sliding way is defined by said top wall and an intermediate wall, said intermediate wall extending only partway from said front wall toward said rear wall.

3. The structure of claim 1 in which said sliding way has an axis disposed at an angle of about 60° to said threading path.

4. A logging hook comprising a unitary metal member being defined by front, rear, side, top and bottom walls and having a top eye portion, an intermediate threading portion and a bottom socket portion, a generally S-shaped opening in said intermediate threading portion extending therethrough from said front to said rear walls, an enlargement at the upper end of said opening providing a path for threading a ferrule-equipped choker line through said opening, a slot in said bottom socket portion extending from said front wall and partway across said bottom wall, said slot communicating with said S-shaped opening and providing a further path for said choker line to pass from being threaded through said S-shaped opening into said bottom socket portion to seat said choker line ferrule in said socket, said top eye portion having a slidng way for a logging line with said sliding way having a threading axis extending at an acute angle to said threading path, said front and rear walls of said top eye portion being generally arcuate to define a generally convex front wall to facilitate bunching of said hooks on said logging line, said S-shaped opening being defined in part by an integral tang in said intermediate threading portion, said tang projecting partially rearwardly to afford an abutment for a ferrule seated in said bottom socket portion.

* * * * *